(12) United States Patent
Ranta-Aho et al.

(10) Patent No.: US 7,715,430 B2
(45) Date of Patent: May 11, 2010

(54) ADDITIONAL MODULATION INFORMATION SIGNALING FOR HIGH SPEED DOWNLINK PACKET ACCESS

(75) Inventors: Karri Ranta-Aho, Espoo (FI); Jorma Kaikkonen, Oulu (FI)

(73) Assignee: Nokia Corporation, Espoo (FI)

( * ) Notice: Subject to any disclaimer, the term of this patent is extended or adjusted under 35 U.S.C. 154(b) by 258 days.

(21) Appl. No.: 11/980,188

(22) Filed: Oct. 30, 2007

(65) Prior Publication Data

US 2008/0117873 A1     May 22, 2008

Related U.S. Application Data

(60) Provisional application No. 60/855,335, filed on Oct. 30, 2006.

(51) Int. Cl.
*H04J 3/16* (2006.01)
(52) U.S. Cl. .................. 370/465; 370/466; 370/467
(58) Field of Classification Search .............. 370/465, 370/329
See application file for complete search history.

(56) References Cited

U.S. PATENT DOCUMENTS

| 6,115,395 A * | 9/2000 | Norrell et al. ............ 370/523 |
| 2003/0123470 A1* | 7/2003 | Kim et al. .............. 370/437 |
| 2004/0028020 A1* | 2/2004 | Frederiksen et al. ....... 370/342 |

OTHER PUBLICATIONS

TSG-RAN WG1 Meeting #46bis, R1-062935, Seoul, Korea, Oct. 9-13, 2006, Ericsson, Higher Order Modulation for HSPA—Impact on RAN1 specifications, Agenda Item 7.3—Scope of future FDD HSPA Evolution.*

TSG-RAN WG1 Meeting #47bis, R1-070179, Sorrento, Italy, Jan. 15-19, 2007, Nokia, HS-SCCH structure for MIMO and 64QAM, Agenda item 7.1—MIMO in UTRA.*

TSG-RAN WG1 Meeting #46bis, Seoul, Korea, Oct. 9-13, 2006, Ericsson, Higher Order Modulation for HSPA—Impact on RAN1 specifications, Agenda Item 7.3—Scope of future FDD HSPA Evolution.

3GPP TS 25.212 V7.5.0 (May 2007) $3^{rd}$ Generation Partnership Project; Technical Specification Group Radio Access Network; Multiplexing and channel coding (FDD) (Release 7).

WCDMA Requirements and Practical Design, Rudolf Tanner and Carlo Luschi, Chapter 12, Future Developments, pp. 335-388.

Ericsson: "Higher Order Modulation for HSPA—Impact on RAN1 specifications, R1-062935" TSG-RAN WG1 Meeting #46BIS, Oct. 9-13, 2006 XP002473742 Seoul , Korea cited in the application p. 1, paragraphs 1, 2.

Philips, Qualcomm, Motorola, Ericsson, Nokia, Renesas: "Change request 25.212 CR 0245: Introduction of 64QAM for HSDPA" *GPP TSG-RAN WG1 Meeting #48, Feb. 13, 2007, XP002473743 St. Louis, USA p. 9, paragraph 4.6.2.3.

* cited by examiner

*Primary Examiner*—Huy D Vu
*Assistant Examiner*—Joey Bednash
(74) *Attorney, Agent, or Firm*—Harrington & Smith

(57) ABSTRACT

The modulation indication bit is interpreted as a QPSK/xQAM modulation indication if both the user equipment and the serving cell support 64QAM modulation, such that if QPSK is indicated, the 7 code-set information bits in the HS-SCCH part 1 structure is interpreted as is presently interpreted today as defined in the 3GPP release 5 specification, and if xQAM is indicated, the 7 code-set information bits in the HS-SCCH part 1 structure is interpreted such that only 6 bits are used for code information and one bit is stolen for use for the 16QAM/64QAM selection.

23 Claims, 12 Drawing Sheets

ADDITIONAL MODULATION INFORMATION SIGNALING FOR HIGH SPEED DOWNLINK PACKET ACCESS

CROSS REFERENCE TO RELATED APPLICATIONS

Reference is made to and priority claimed from U.S. provisional application Ser. No. 60/855,335, filed Oct. 30, 2006.

FIELD OF THE INVENTION

The invention relates generally to the field of wireless communication systems and deals with HSDPA with adaptive modulation, and more specifically with signaling support for 64QAM for HSDPA. In particular, the invention relates to a method for interpreting the modulation indication bit as a QPSK/xQAM indication if both the UE and the cell support 64QAM.

The invention further relates to a method for indicating the modulation of the second data stream in MIMO dual stream transmit diversity signaling on HSDPA.

LIST OF ABBREVIATIONS

| | |
|---|---|
| ACI: | Adjacent Channel Interference |
| ACPR: | Adjacent channel power ratio |
| AP: | Access Point |
| B3G: | Beyond 3rd Generation |
| CHUNK: | Basic time-frequency resource unit for OFDM links |
| DL: | Downlink |
| DRX: | Discontinuous Reception |
| DTX: | Discontinuous Transmission |
| FDD: | Frequency division duplex |
| HARQ: | Hybrid Automatic Repeat Request |
| HSDPA: | High Speed Downlink Packet Access |
| HS-DSCH: | High Speed Downlink Shared Channel |
| HS-PDSCH: | High Speed Physical Downlink Shared Channel |
| HS-SCCH: | High Speed Shared Control Channel |
| LTE: | Long Term Evolution |
| MIMO: | Multiple Input - Multiple Output |
| MT: | Mobile Terminal |
| NB: | Narrowband (FDD mode of the WINNER system) |
| OFDM: | Orthogonal Frequency Division Multiplexing |
| QAM: | Quadrature Amplitude Modulation |
| QPSK: | Quadrature Phase Shift Keying |
| RAN: | Radio Access Network |
| RAT: | Radio Access Technology |
| TDD: | Time division duplex |
| UE: | User Equipment |
| UL: | Uplink |
| UT: | User Terminal |
| WB: | Wideband (TDD mode of the WINNER system) |
| WLAN: | Wireless Local Area Network |
| WINNER: | Wireless World Initiative New Radio |

BACKGROUND OF THE INVENTION

The 3GPP Release-5/6/7 specifications define HSDPA with adaptive modulation where the used modulation is either QPSK or 16QAM depending on the Node B scheduler decision for providing communication in for example, a cellular telecommunications system such as schematically represented in FIG. 1 and generally designated 4. Recently there has been discussion on also introducing the possibility of using 64QAM with HSDPA in 3GPP. At the same time, 3GPP is specifying a MIMO (multiple input-multiple output) multi-antenna technique for HSDPA MIMO which requires some redesign for the HSDPA related control channels.

With reference to FIG. 2, the current HS-SCCH structure used to inform the format of the actual HS-DSCH transmission (including the used modulation) is split to two parts. HS-SCCH Part 1 contains 8 bits of which 7 bits are used to inform the used HS-PDSCH codes for the HS-DSCH transmission and one bit is used to inform or identify the modulation (QPSK/16QAM) used on those HS-PDSCH codes. HS-SCCH Part 2 provides further information for example, transport block size, HARQ information, etc.

The reader is referred to the literature in the art and numerous text references for a further understanding of HSDPA such as found for example in Chapter 12 of the text titled "WCDMA Requirements and Practical Design" published by Wiley, and which is incorporated herein by reference.

Still considering FIG. 2, the HS-SCCH transmission starts 5120 chips earlier than the HS-DSCH transmission in order to allow the user equipment (UE) receiver to get the first part (part 1) of the HS-SCCH before the HS-DSCH reception starts and thus to know in advance the codes and modulation used on the HS-DSCH.

Now with the added requirement of HSDPA MIMO, the intention is to further add two bits of the antenna weights used for the HS-DSCH transmission to HS-SCCH part 1 and one bit indicating the number of streams, one or two, used in the downlink's transmission (a rank-indicator bit) to also provide this MIMO specific information to the receiver. Part 1 of HS-SCCH structure therefore would be required to carry either 8 bits or 11 bits depending on whether MIMO is in use or not. As a consequence of the HSDPA MIMO requirement, two different HS-SCCH Part 1 formats must be specified.

The problem that must now be solved is how to add a new modulation (64QAM) indication to the part 1 of the HS-SCCH structure.

Ericsson's R1-062935 in 3GPP RAN1 meeting #46bis in October 2006, entitled "Higher Order Modulation for HSPA-Impact on RAN1 specifications" which is incorporated herein by reference suggests using the same approach as was done with the antenna weight bits with MIMO, that is, to make room for one additional bit to the part 1 of the HS-SCCH structure by reducing the error correction coding of the part 1. The approach described by Ericsson for adding a new modulation indication to the HS-SCCH part 1 for identifying 64QAM modulation is not satisfactory because a further additional bit must be added to the HS-SCCH part 1 structure.

The disadvantages of adding a new modulation bit to the HS-SCCH first part for 64 QAM or HSDPA MIMO operation include at least the following concerns that make the proposal unacceptable:

1) two new HS-SCCH formatted structures are required in addition to the other two HS-SCCH formatted structures. The number of HS-SCCH formats would be doubled to 4 different HS-SCCH formats to cover the situations with/without MIMO and with/without 64QAM support and would require additional buffering to determine the modulation indication to distinguish between 16QAM modulation and 64QAM modulation, and 2) there would be a reduction in the coding protection of the HS-SCCH part 1 as less error correction coding can be applied resulting a non-negligible impact to the performance.

What is needed is a single HS-SCCH structure that allows for the introduction of 64QAM modulation indication without requiring additional room for bits in the HS-SCCH part 1 structure to provide the 64 QAM modulation indication without requiring a different coding for the HS-SCCH when 64QAM modulation usage is enabled. or reducing the error correction coding that can be applied when 64 QAM modulation is enabled.

SUMMARY OF THE INVENTION

In one broad aspect, the invention concerns interpreting the current modulation indication bit as a QPSK/xQAM modulation indication if both the user equipment (UE) and the cell support 64QAM modulation, such that if QPSK is indicated, the 7 code information bits in the HS-SCCH part 1 structure is interpreted as is presently interpreted today as defined in the 3GPP release 5 specification, and if xQAM is indicated, the 7 code information bits in the HS-SCCH part 1 structure are interpreted such that only 6 bits are used for code information and one bit is used for the 16QAM/64QAM selection.

In another broad aspect, the invention concerns indicating the modulation of the second data stream in MIMO signaling in which the HS-SCCH indicates the UE as either one (single-stream) or two (dual-stream) separate parallel HSDPA data transmission on HS-PDSCH's in which a "rank indicator" bit in HS-SCCH part 1 structure indicates whether one or two data streams are being transmitted.

WRITTEN DESCRIPTION OF EXEMPLARY EMBODIMENTS OF THE INVENTION

Figure 4A:
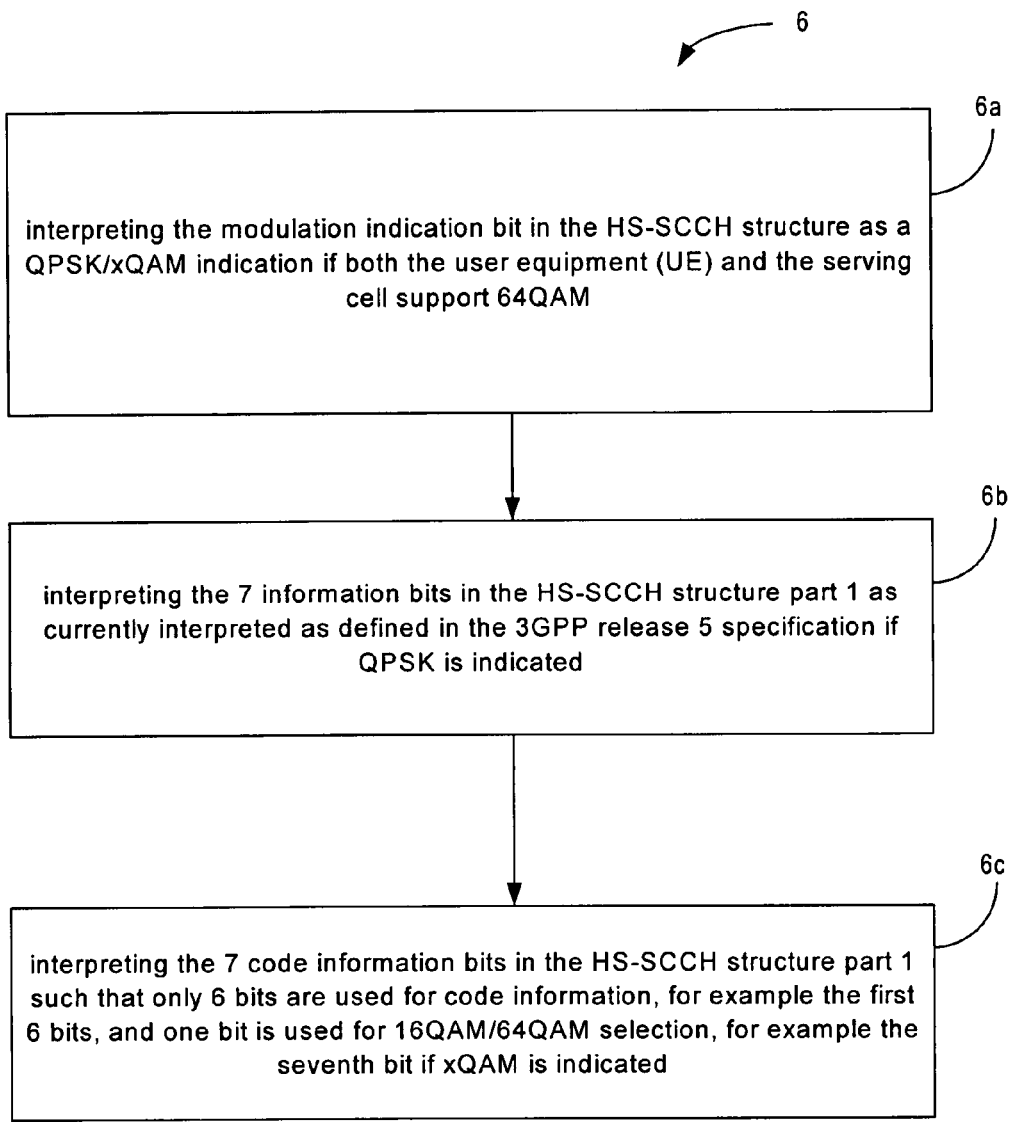
FIGS. 4A and 4B show flow charts of the basic steps of some embodiments of the present invention.

FIG. 4A shows a flowchart generally indicated as 6 having the basic steps 6a, 6b and 6c for implementing the inventive method according to some embodiments of the present invention, including steps for interpreting the modulation indication bit in the HS-SCCH structure as an indication of QPSK/xQAM if both the user equipment (UE) and the serving cell support 64QAM (step 6a).

Figure 3A:
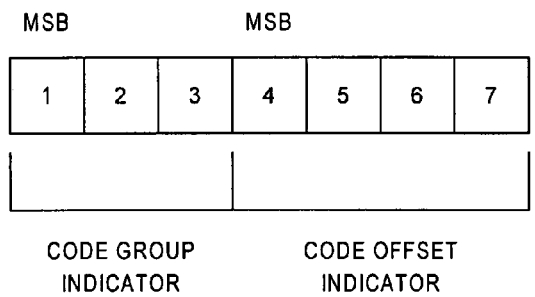
FIG. 3A shows the channelization code-set bits in HS-SCCH part 1 structure as they are currently interpreted in the normal manner.

If QPSK is indicated, then the 7 code information bits or channelization code-set bits in the HS-SCCH structure part 1 are interpreted as currently interpreted as defined in the 3GPP release 5 specification (step 6b). In FIG. 3A, the first three bits represent the group code indicator with the first bit of the three being the most significant bit. The last four bits represent the code offset indication with the first bit of the last four bits being the most significant bit.

Figure 3B:
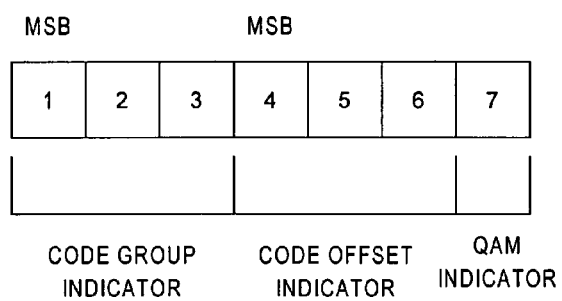
FIG. 3B shows the channelization code-set bits in HS-SCCH part 1 structure as they are interpreted in accordance with the present invention.

If xQAM is indicated, then the 7 code information bits or channelization code-set bits in the HS-SCCH structure part 1 are interpreted as schematically shown in FIG. 3B for example such that only 6 bits are used for code information for example the first 6 bits, and one bit is used for 16QAM/64QAM selection for example the seventh bit (step 6c). In FIG. 3B, the first three bits represent the group code indicator with the first bit of the three bits being the most significant bit. The next three bits represent the code offset indicator with the first bit if the three bits being the most significant bit. The last or seventh bit is stolen and represents the QAM selection indicator, for example, a "0" may be used to indicate a 16QAM selection and a "1" may be used to indicate a 64QAM selection. Obviously, the "0" and "1" may be reversed with a "1" indicating a 16QAM selection and a "0" indicating a 64QAM selection. Thus, the last or seventh channelization code-set bit is stolen to provide the choice between 16QAM and 64QAM.

The scope of the invention is not intended to be limited to the order in which the steps in FIG. 4A are performed. The steps 6a, 6b, 6c may be implemented in one or more modules configured to do the same and located in suitable user equipment, terminals, nodes, access points or devices, for example a mobile terminal.

Figure 4B:
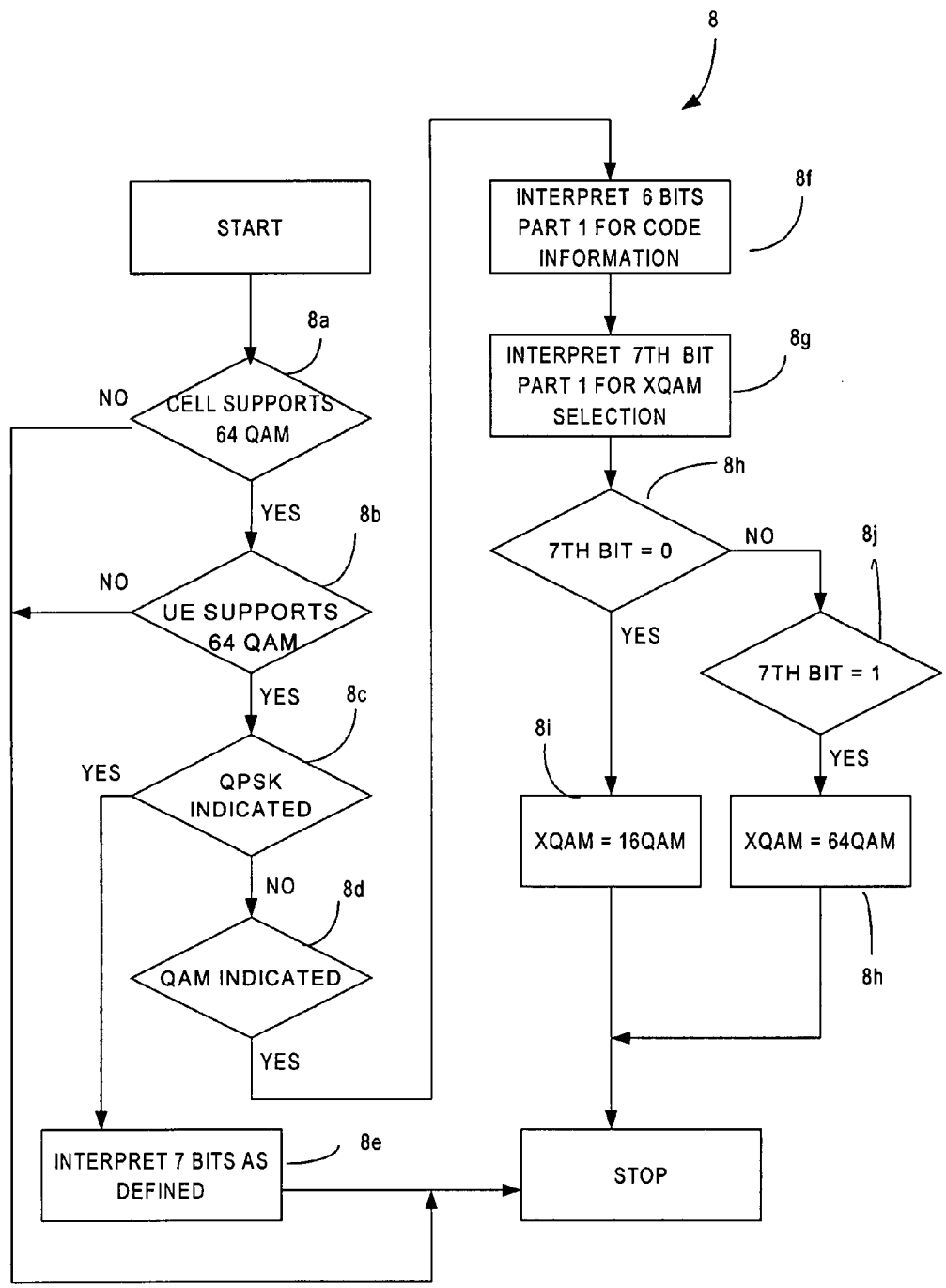

FIG. 4B shows a flowchart generally indicated as 8 having steps 8a-8k for implementing the inventive method according to some embodiments of the present invention including determining if the cell and user equipment support 64QAM (steps 8a, 8b), if QPSK or QAM is indicated (steps 8c, 8d), and if QPSK is indicated interpreting the seven information bits as currently defined in 3PGG specification release 5 (step 8e), or if QAM is indicated interpreting six bits of HS-SCCH part 1 for code information (step 8f), and interpreting the seventh bit of HS-SCCH part 1 for xQAM selection (step 8g), testing the seventh bit to determine if it is a "zero" or a "one" (steps 8h, 8j) and if a "zero" selecting xQAM as 16QAM (step 8i), and if a "one" selecting xQAM as 64QAM (step 8k). The scope of the invention is not intended to be limited to the order in which the steps in FIG. 4B are performed for example, the order of determining whether the user equipment and/or the cell supports 64QAM can be determined in any order.

It is understood that the aforementioned methods as sown for example in FIGS. 4A and 4B may include other steps known in the art that do not form part of the underlying invention.

The basic premise according to some embodiments of the present invention is to interpret the current modulation indication bit in the HS-SCCH structure as a QPSK/xQAM indication if both the UE and the cell support 64QAM. If QPSK is indicated, then the 7 code information bits in the HS-SCCH part 1 is interpreted as is presently interpreted today according to 3GPP release 5 specifications. If xQAM is indicated (the modulation bit indicates 16QAM according to the 3GPP release 5 specifications, but 64QAM support has been enabled to the receiver), then the 7 code information bits in the HS-SCCH part 1 is interpreted in accordance with the present invention such that only 6 bits are used for code information and one bit is used to indicate the 16QAM/64QAM selection.

In accordance with some embodiments the invention may be implemented as described in the following example.

A modulation indication bit $X_{ms,1}$ is derived from the modulation and given by the following condition:

$$x_{ms,1} = \begin{cases} 0 \text{ if } QPSK \\ 1 \text{ otherwise} \end{cases}$$

At the present time and in accordance to 3GPP release 5 specifications, the 7 bits for channelization code set information are defined as set forth in TS25.212, which is incorporated herein by reference.

The channelization code-set bits $X_{ccs,1}, X_{ccs,2}, \text{---}, X_{cc,7}$ are coded according to the following condition:

given P (multi-) codes starting at code O, and given the HS-SCCH number, if 64QAM is configured for the user equipment (UE) and $x_{ms,1}=1$, calculating the information-field using the unsigned binary representation of integers calculated by the expressions, for the first three bits (code group indicator) of which $x_{ccs,1}$ is the MSB: $x_{ccs,1}, x_{ccs,2}, x_{ccs,3}=\min(P-1,15-P)$; or if 64QAM is not configured for the user equipment (UE), or if 64QAM is configured and $x_{ms,1}=0$, then for the last four bits (code offset indicator) of which $x_{ccs,4}$ is the MSB: $x_{ccs,4}, x_{ccs,5}, x_{ccs,6}, x_{ccs,7}=|O-1-\lfloor P/8 \rfloor*15|$; otherwise if 64QAM is configured for the user equipment (UE) and $x_{ms,1}=1$, P and O shall fulfill $|O-1-\lfloor P/8 \rfloor*15| \mod 2 = $ (HS-SCCH number)mod 2, and then $x_{ccs,4}, x_{ccs,5}, x_{ccs,6}, x_{ccs,dummy}=|O-1-\lfloor P/8 \rfloor*15|$, where $x_{ccs,dummy}$ is a dummy bit that is not transmitted on the HS-SCCH, and $$x_{ccs,7} = \begin{cases} 0 \text{ if } 16QAM \\ 1 \text{ if } 64QAM \end{cases}.$$

The definitions of P and O are given in 3GPP TS25.213, which is incorporated herein by reference. The HS-SCCH number is given by the position in the list of HS-SCCH Channelization Code Information signaled by higher layers. The HS-SCCH number is associated with the code offset indicator and code group indicator as described above if 64QAM is configured for the UE and $x_{ms,1}=1$.

Figure 1:
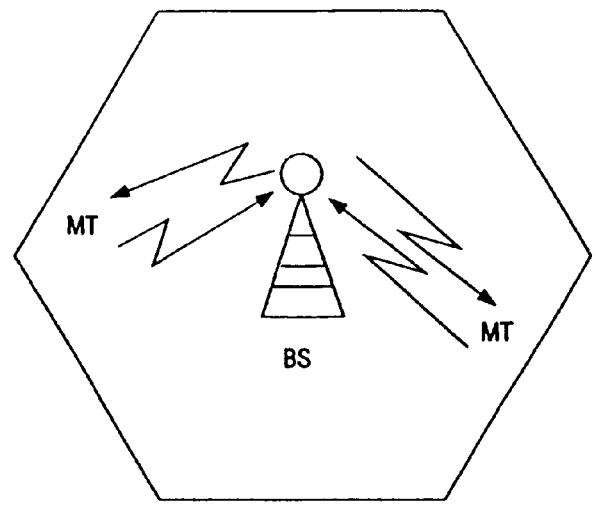
FIG. 1 is a schematic representation of a cellular telecommunications system showing signaling between a UE or mobile terminal and a base station in a cell.
Figure 2:
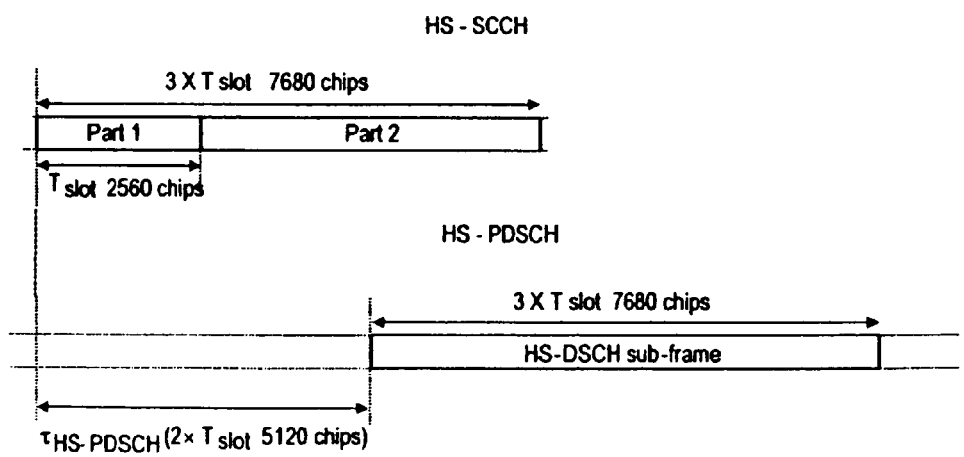
FIG. 2 is a timing diagram showing the timing relation between the HS-SCCH and the HS-PDSCH.
Figure 5:
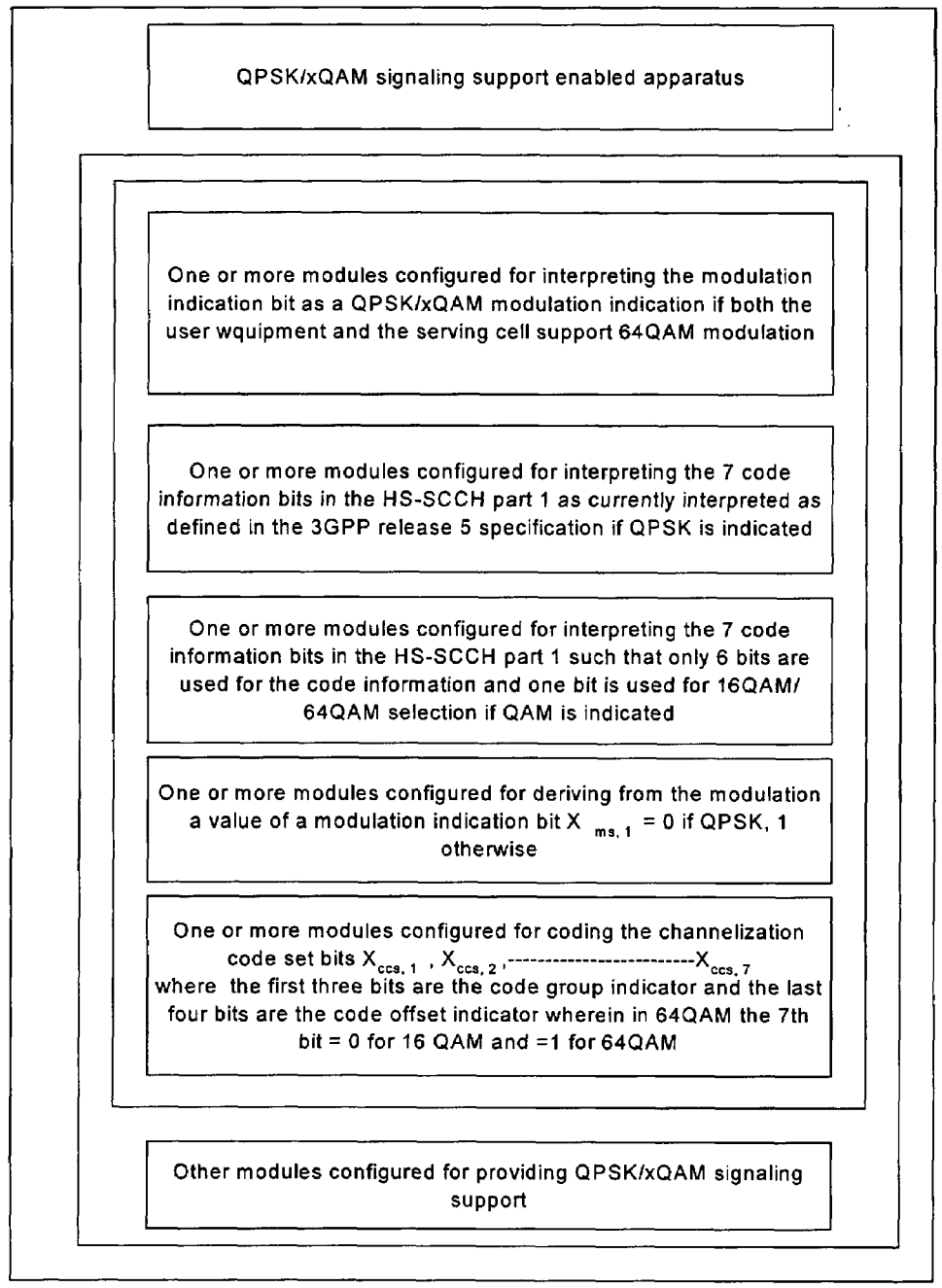
FIG. 5 shows a QPSK/xQAM signaling support enabled apparatus according to some embodiments of the present invention.

FIG. 5 shows by way of example a user equipment in the form of a QPSK/xQAM signaling support enabled apparatus according to some embodiments of the present invention for the cellular telecommunications system as shown in FIG. 1 or other suitably configured and arranged network. The QPSK/xQAM signaling support enabled apparatus has one or more modules configured for interpreting the modulation indication bit as a QPSK/xQAM modulation indication if both the user equipment and the serving cell support 64QAM modulation. Consistent with that, one or more modules are configured for interpreting the 7 code information bits in the HS-SCCH part 1 structure as currently interpreted as defined in 3GPP release 5 specification if QPSK is indicated, and one or modules are configured for interpreting the 7 code information bits in the HS-SCCH part 1 structure such that only 6 bits are used for code information and one bit is used for 16QAM/64QAM selection if xQAM is indicated. One or more modules are configured for deriving from the modulation a value of a modulation indication bit to indicate QPSK or otherwise. One or more other modules are configured for coding the channelization code-set bits where the first three bits are the code group indicator and the next three bits are the code offset indicator and wherein the 7th bit is stolen to indicate 16QAM or 64QAM selection.

In accordance with some other embodiments of the invention, the channelization code-set bits $x_{ccs,1}, x_{ccs,2}, \ldots, x_{ccs,7}$ are coded according to the following:

given P (multi-)codes starting at code O calculate the information-field using the unsigned binary representation of integers calculated by the expressions, for the first three bits (code group indicator) of which $x_{ccs,1}$ is the MSB: $x_{ccs,1}, x_{ccs,2}, x_{ccs,3}=\min(P-1,15-P)$; for the last four bits (code offset indicator) of which $x_{ccs,4}$ is the MSB: $x_{ccs,4}, x_{ccs,5}, x_{ccs,6}, x_{ccs,7}=|O-1-[P/8]*15|$.

The definitions of P and O are set forth in TS25.213, which is incorporated herein by reference.

The idea behind channelization code set information is that out of the 15 possible HS-DSCH codes, the bits indicate which code is the first one and how many consecutive codes are to be used.

Now in accordance with some embodiments of the invention, the bits are interpreted in a novel way to realize additional modulation information signaling for HSDPA.

This interpretation is done by first modifying the interpretation of the start code to be {1,3,5,7,9,11,13,15} instead of {1, 2, 3, ..., 15}, and the bits are defined so that:

The channelization code-set bits $x_{ccs,1}, x_{ccs,2} \ldots, x_{ccs,7}$ are coded according to the following:

given P (multi-)codes starting at code O calculate the information-field using the unsigned binary representation of integers calculated by the expressions, for the first three bits (code group indicator) of which $x_{ccs,1}$ is the MSB: $x_{ccs,1}, x_{ccs,2}, x_{ccs,3}=\min(P-1,15-P)$; for the next three bits (code offset indicator) of which $x_{ccs,4}$ is the MSB: $x_{ccs,4}, x_{ccs,5}, x_{ccs,6}=|O-1-P/8*15|/2$, and O is always an odd number.

For the last bit (16QAM/64QAM indicator) $x_{ccs,7}$:

$$x_{ccs,7} = \begin{cases} 0 \text{ if } 16QAM \\ 1 \text{ if } 64QAM \end{cases}$$

In other words only the three most significant bits of the code offset indicator are sent and the O is always assumed to be an odd number and the bit saved from the code offset indicator bits is used to indicate whether 16QAM or 64QAM modulation is used.

In accordance with some embodiments of the invention, one bit is stolen from the number of codes so that the number of HS-PDSCH codes is {1, 3, 5, . . . , 15 } instead of {1, 2, 3, . . . , 15}.

In accordance with some other embodiments of the invention, both the number of codes and the starting code is limited to odd numbers and have two bits available for additional signaling.

It is also pointed out that this mechanism could be used to deliver some other information for example, relative HS-PDSCH code power instead of or with additional modulation information. Thus, the method for stealing bits from the code-set information should be isolated from what the stolen bit/bits are actually used for. If possible this method for reinterpreting the code set information bits should also be separated from the usage of the QPSK/QAM modulation bit in the part 1 of HS-SCCH structure.

It should be pointed out that in some embodiments of the invention the granularity of the code allocations in the HS-DSCH transmission may be somewhat reduced.

Figure 6A:
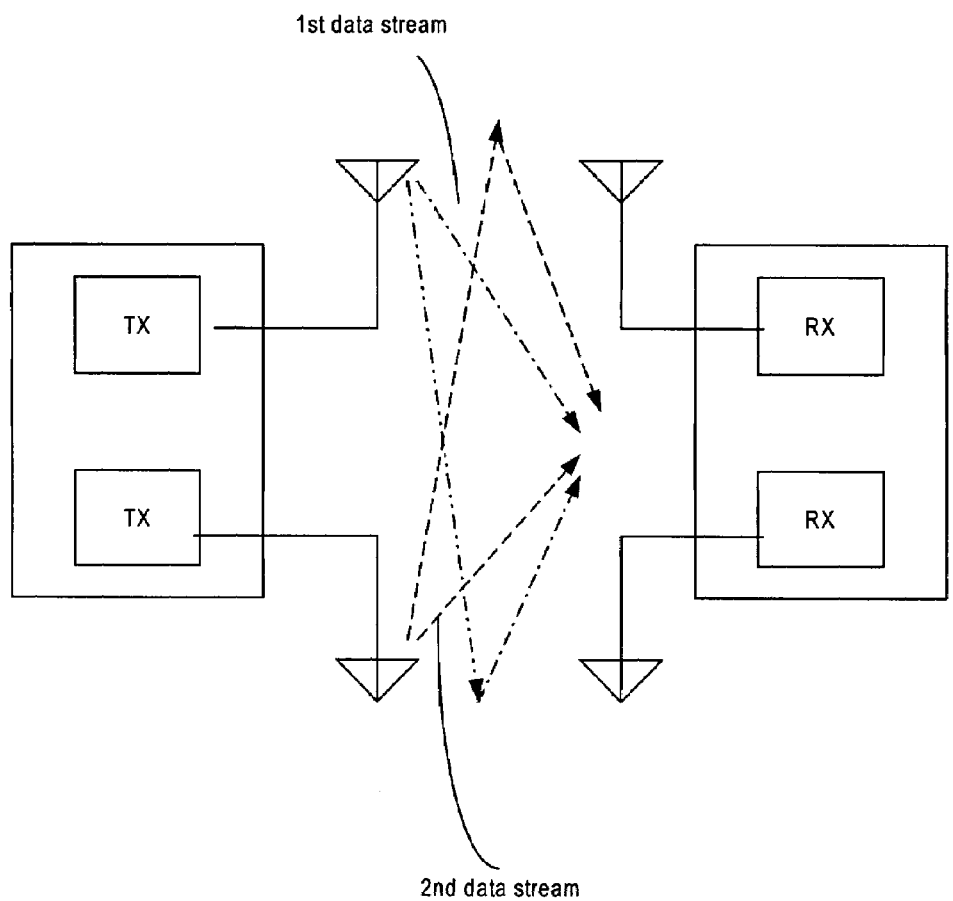
FIG. 6A shows a schematic representation of a MIMO wireless communication system in which a "rank indication" bit is used for informing how the 7 channelization code set information bits are interpreted as the modulation indication of the second data stream.
Figure 6B:
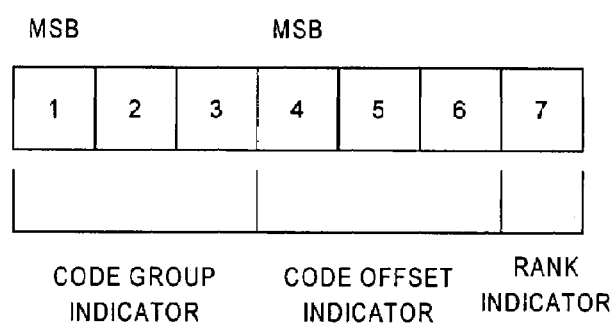
FIG. 6B shows the channelization code-set bits in a HS-SCCH part 1 structure as they are interpreted according to some embodiments of the invention in MIMO wireless communication systems.

In accordance with the inventive method of some embodiments, the present invention may be implemented with MIMO (Dual-stream transmit diversity) shown schematically for example in FIG. 6A, in which the HS-SCCH indicates the UE of either one (single-stream) or two (dual-stream) separate parallel HSDPA data transmissions on HS-PDSCHs. The two streams may use different modulations. The part 1 of the MIMO HS-SCCH is expected to carry three new bits, two bits indicating the D-TxAA antenna weights specific to the MIMO operation and one bit indicating whether the transmission is using one or two data streams a "rank indication" for example as shown in FIG. 6B. In FIG. 6B, the first three bits represent the group indicator with the first bit being the most significant bit. The next three bits represent the code offset indicator with the first of the three bits being the most significant bit. The last or seventh bit represents the rank indicator to indicate whether the transmission is using one or two data streams. In the dual stream case the selection of how many codes are to be used can be coarser than in the single stream case.

In the above MIMO example, the "rank indication" bit could inform how the seven "channelization-code-set information" bits are to be interpreted. If the "rank indicator" indicates dual-stream transmission, then at least one of the "channelization-code-set-information" bits are interpreted as the modulation indication of the second stream when the modulation of the first stream (or the only stream in the case of single-stream transmission) is always interpreted the same way based on the "modulation scheme information" bit in the HS-SCCH, for example by the method of the basic premise according to some embodiments of the invention as described herein above.

Thus in summary with the MIMO example: If the "rank indication" bit indicates single stream transmission, then the 7 code information bits in HS-SCCH part 1 is interpreted as is presently interpreted today as defined in 3GPP release 5 specification. If the "rank indication" bit indicates dual stream transmission, the 7 code information bits in the HS-SCCH part 1 is interpreted in accordance with the inventive method of some embodiments of the present invention such that only 6 bits are used for code information and one bit is used to indicate the modulation selection (QPSK/16QAM) for the second stream.

The problem with MIMO operation is that when two streams are transmitted then the modulation needs to be indicated separately for both streams. It has been earlier agreed that the same number of codes will apply for both streams. It has also been shown that the dual-stream transmission case does not require full flexibility in indicating the number of codes to be used, but maintaining that flexibility with the single-stream transmission is desirable.

Thus one aspect of the concept of the inventive method of the present invention would be to indicate with the "rank indicator" bit also how the code information bits are to be interpreted. When the single stream operation is used then the bits are interpreted normally as defined in the standard today or as defined in some of the other embodiments of the present invention as described herein. If the dual stream operation is used then at least one bit of the "channelization-code-set information" could be used to signal the modulation used in the second stream.

Figure 7A:
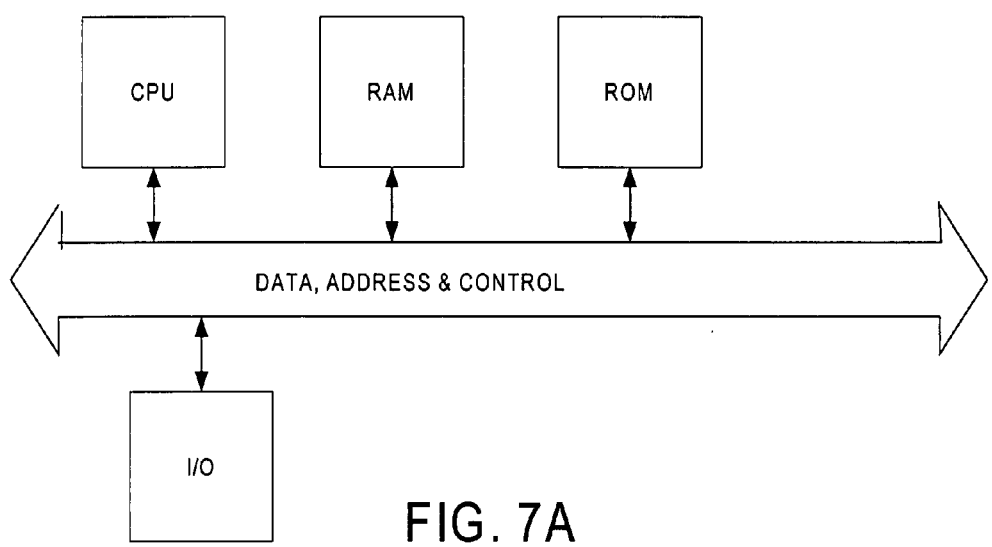
FIG. 7A is a functional block diagram of an example of a signal processor for carrying out the invention.

The interactions between the major logical elements and functions should be obvious to those skilled in the art for the level of detail needed to gain an understanding for implementing the present invention. It should be noted that some embodiments of the invention may be implemented with an appropriate signal processor such as shown in FIG. 7A, a digital signal processor or other suitable processor to carry out the intended function of the invention.

Figure 7B:
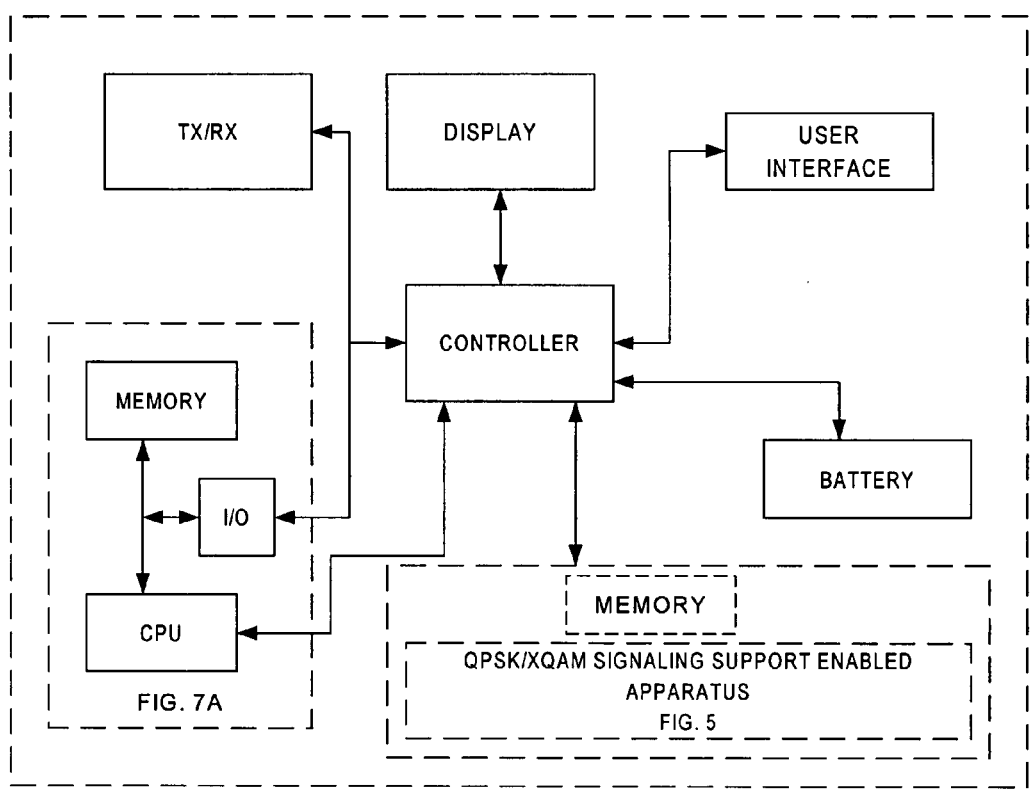
FIG. 7B is a functional block diagram of an example of a UE or mobile terminal having QPSK/xQAM signaling support according to some embodiments of the present invention.

Turning now to FIG. 7B, a schematic functional block diagram of a user equipment (UE) for example a mobile terminal is illustrated therein showing the major operational functional components which may be required to carry out the intended functions of the mobile terminal and implement the concept of the invention. A processor such as the signal processor of FIG. 7A carries out the computational and operational control of the mobile terminal in accordance with one or more sets of instructions stored in a memory. A user interface may be used to provide alphanumeric input and control signals by a user and is configured in accordance with the intended function to be carried out. A display sends and receives signals from the controller that controls the graphic and text representations shown on a screen of the display in accordance with the function being carried out.

The controller controls a transmit/receive unit that operates in a manner well known to those skilled in the art. The functional logical elements for indicating 64QAM support according to some embodiments of the present invention for example, the QPSK/xQAM signaling support enabled apparatus as shown in FIG. 5 are suitably interconnected with the controller to carry out the modulation indication and interpretation of the channelization information codes as contemplated in accordance with some embodiments of the invention. An electrical power source such as a battery is suitably interconnected within the mobile terminal to carry out the functions described above. It will be recognized by those skilled in the art that the user equipment may be implemented in other ways other than that shown and described and may be implemented for example in a node, access point, or other suitably configured and arranged devices and apparatus.

The invention involves or is related to cooperation between elements of a communication system. Examples of a wireless communication system include implementations of GSM (Global System for Mobile Communication) and implementations of UMTS (Universal Mobile Telecommunication System). These elements of the communication systems are exemplary only and does not bind, limit or restrict the invention in any way to only these elements of the communication systems since the invention is likely to be used for B3G systems. Each such wireless communication system includes a radio access network (RAN). In UMTS, the RAN is called UTRAN (UMTS Terretrial RAN). A UTRAN includes one or more Radio Network Controllers (RNCs), each having control of one or more Node Bs, which are wireless terminals configured to communicatively couple to one or more UE terminals. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS).

Figure 8:
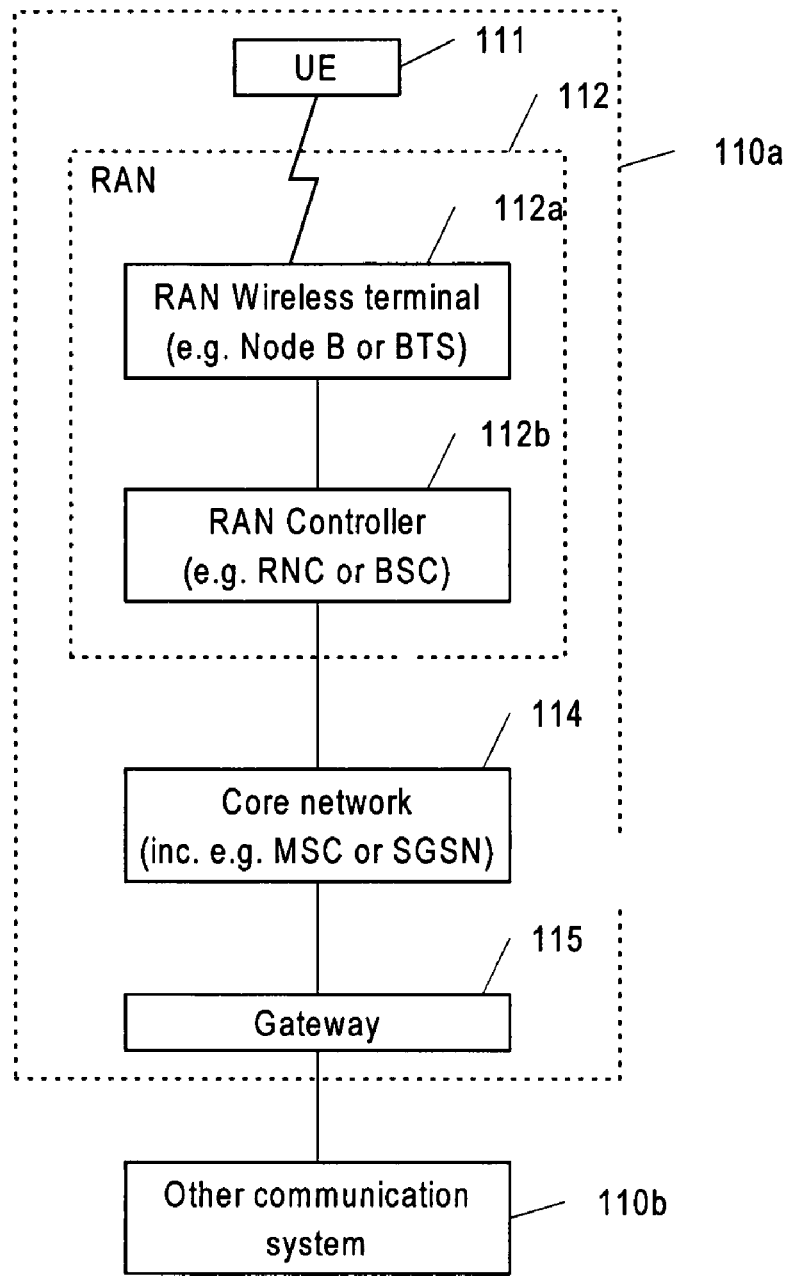
FIG. 8 is a block diagram/flow diagram of a wireless communication system in which the present invention may be implemented, including various communication terminals, and in particular a user equipment (UE) terminal and a wireless terminal of a radio access network (RAN).

Referring now to FIG. 8, a wireless communication system 110*a* in which the present invention may be implemented is shown, including a UE terminal 111, a radio access network 112, a core network 114 and a gateway 115, coupled via the gateway to another communications system 110*b*, such as the Internet, wireline communication systems (including the so-called plain old telephone system), and/or other wireless communication systems. The radio access network includes a wireless terminal 112*a* (e.g. a Node B or a BTS) and a controller 112*b* (e.g. a RNC or a BSC). The controller is in wireline communication with the core network. The core network typically includes a mobile switching center (MSC) for circuit-switched communication, and a serving general packet radio service (GPRS) support node (SGSN) for packet-switched communication.

Figure 9:
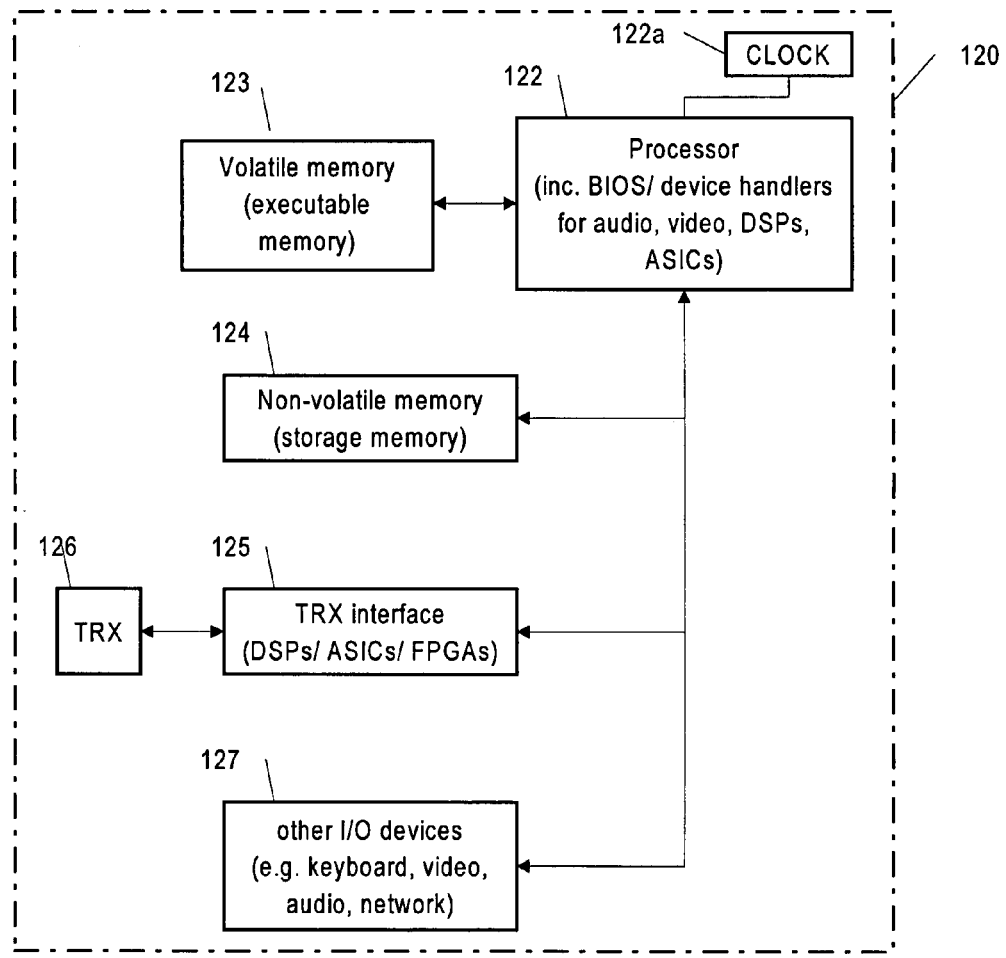
FIG. 9 is a reduced block diagram (only portions relevant to the invention being shown) of the UE terminal or the wireless terminal of the RAN of FIG. 8.

FIG. 9 shows some components of a communication terminal 120, which could be either the UE terminal 111 or the RAN wireless terminal 112*a* of FIG. 8. The communication terminal includes a processor 122 for controlling operation of the device, including all input and output. The processor, whose speed/timing is regulated by a clock 122*a*, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 126 via a TRX interface 125 including possibly one or more digital signal processors (DSPs), application specific integrated circuits (ASICs), and/or field programmable gate arrays (FPGAs). The TRX enables communication over the air with another similarly equipped communication terminal.

Still referring to FIG. 9, the communication terminal includes volatile memory, i.e. so-called executable memory 123, and also non-volatile memory 124, i.e. storage memory. The processor 122 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Figure 10:
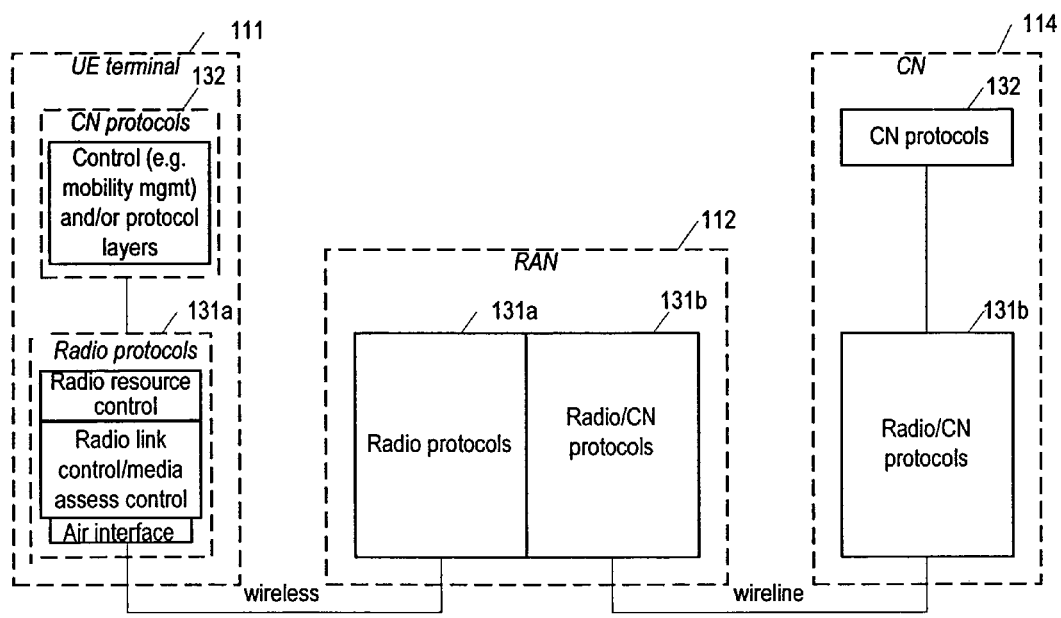
FIG. 10 is a reduced block diagram of two communications terminals of FIG. 8 in terms of a multi-layered communication protocol stack.

Referring now to FIG. 10, the wireless communication system of FIG. 8 is shown from the perspective of layers of a protocol according to which communication is performed. The layers of protocol form a protocol stack, and include CN protocol layers 132 located in the UE 111 and CN 114, and radio protocol layers 131*a* located in the UE terminal and in the RAN 112 (in either the RAN wireless terminal 112*a* or the RAN controller 112*b*). Communication is peer-to-peer. Thus, a CN protocol layer in the UE communicates with a corresponding layer in the CN, and vice versa, and the communication is provided via lower/intervening layers. The lower/intervening layers thus provide as a service to the layer immediately above them in the protocol stack the packaging or unpackaging of a unit of communication (a control signal or user data).

The CN protocols typically include one or more control protocol layers and/or user data protocol layers (e.g. an application layer, i.e. the layer of the protocol stack that interfaces directly with applications, such as a calendar application or a game application).

The radio protocols typically include a radio resource control (protocol) layer, which has as its responsibilities, among quite a few others, the establishment, reconfiguration, and release of radio bearers. Another radio protocol layer is a radio link control/media access control layer (which may exist as two separate layers). This layer in effect provides an interface with the physical layer, another of the radio access protocol layers, and the layer that enables actual communication over the air interface.

The radio protocols are located in the UE terminal and in the RAN, but not the CN. Communication with the CN protocols in the CN is made possible by another protocol stack in the RAN, indicated as the radio/CN protocols stack. Communication between a layer in the radio/CN protocols stack and the radio protocols stack in the RAN may occur directly, rather than via intervening lower layers. There is, as shown in FIG. 9, a corresponding radio/CN protocols stack located in the CN, allowing then communication between the application level in the UE terminal and the application level in the CN.

Figure 11:
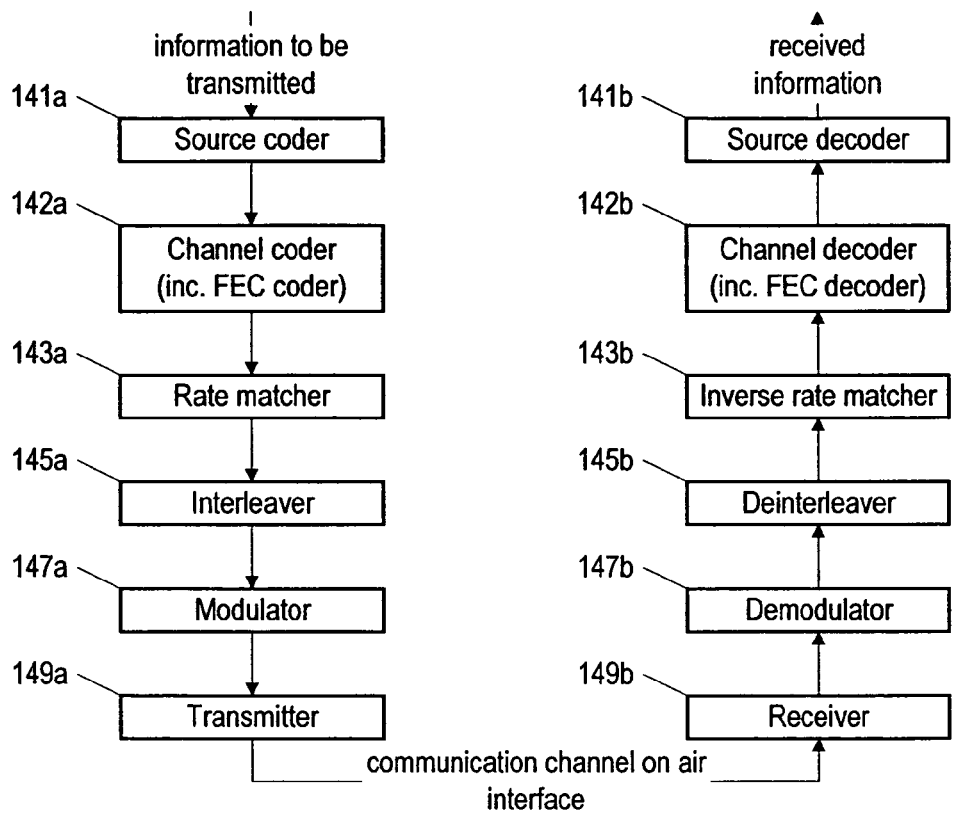
FIG. 11 is a reduced block diagram of the user equipment terminal and the wireless terminal of the radio access network in terms of functional blocks corresponding to hardware equipment used in sending and receiving communication signals over an air interface communication channel linking the two communications terminals.

FIG. 11 is a reduced block diagram of the UE communication terminal 111 and the RAN wireless communication terminal 112*a* of FIG. 8, in terms of functional blocks corresponding to typically hardware (but in some cases software) equipment used in sending and receiving communication signals over a communication channel linking the two communications terminals 111, 112*a*. Both typically include a source coder 141*a* responsive to information to be transmitted, and a corresponding source decoder 141*b*. The source coder removes redundancy in the information not needed to communicate the information. Both also include a channel coder 142*a* and a corresponding channel decoder 142*b*. The channel coder typically adds redundancy that can be used to correct error, i.e. it performs forward error correction (FEC) coding. Both communication terminals also include a rate matcher 143*a* and corresponding inverse rate matcher 143*b*. The rate matcher adds or removes (by so-called puncturing) bits from the bit stream provided by the channel coder, in order to provide a bit stream at a rate compatible with the physical channel being used by the communication terminals. Both communication terminals also include an interleaver 145*a* and a deinterleaver 145*b*. The interleaver reorders bits (or blocks of bits) so that strings of bits representing related information are not contiguous in the output bit stream, thus making the communication more resistant to so-called bursty errors, i.e. to errors from temporary causes and so that affect the communication for only a limited time, and so affect only a portion of the communicated bit stream. Both communication terminals also include a modulator 147*a* and a demodulator 147*b*. The modulator 147*a* maps blocks of the bits provided by the interleaver to symbols according to a modulation scheme/mapping (per a symbol constellation). The modulation symbols thus determined are then used by a transmitter 49*a* included in both communication terminals, to modulate one or more carriers (depending on the air interface, e.g. WCDMA, TDMA, FDMA, OFDM, OFDMA, CDMA2000, etc.) for transmission over the air. Both communication terminals also include a receiver 149*b* that senses and so receives the communication terminal and determines a corresponding stream of modulation symbols, which it passes to the demodulator 147b, which in turn determines a corresponding bit stream (possibly using FEC coding to resolve errors), and so on, ultimately resulting in a providing of received information (which of course may or may not be exactly the transmitted information). Usually, the channel decoder includes as components processes that provide so-called HARQ (hybrid automatic repeat request) processing, so that in case of an error not able to be resolved on the basis of the FEC coding by the channel coder, a request is sent to the transmitter (possibly to the channel coder component) to resend the transmission having the unresolvable error.

The functionality described above (for both the radio access network and the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

The concept of the invention may be used in any wireless system including but not limited to B3G wireless systems for example, Long Term Evolution (LTE) (also known as 3.9G), which refers to research and development involving the Third Generation Partnership Project (3GPP) aimed at identifying technologies and capabilities that can improve systems such as the UMTS.

Generally speaking, a prefix of the letter "E" in upper or lower case signifies LTE, although this rule may have exceptions. The E-UTRAN consists of eNBs (E-UTRAN Node B), providing the E-UTRA user plane (RLC/MAC/PHY) and control plane (RRC) protocol terminations towards the UE. The eNBs interface to the access gateway (aGW) via the S1, and are inter-connected via the X2.

Figure 12:
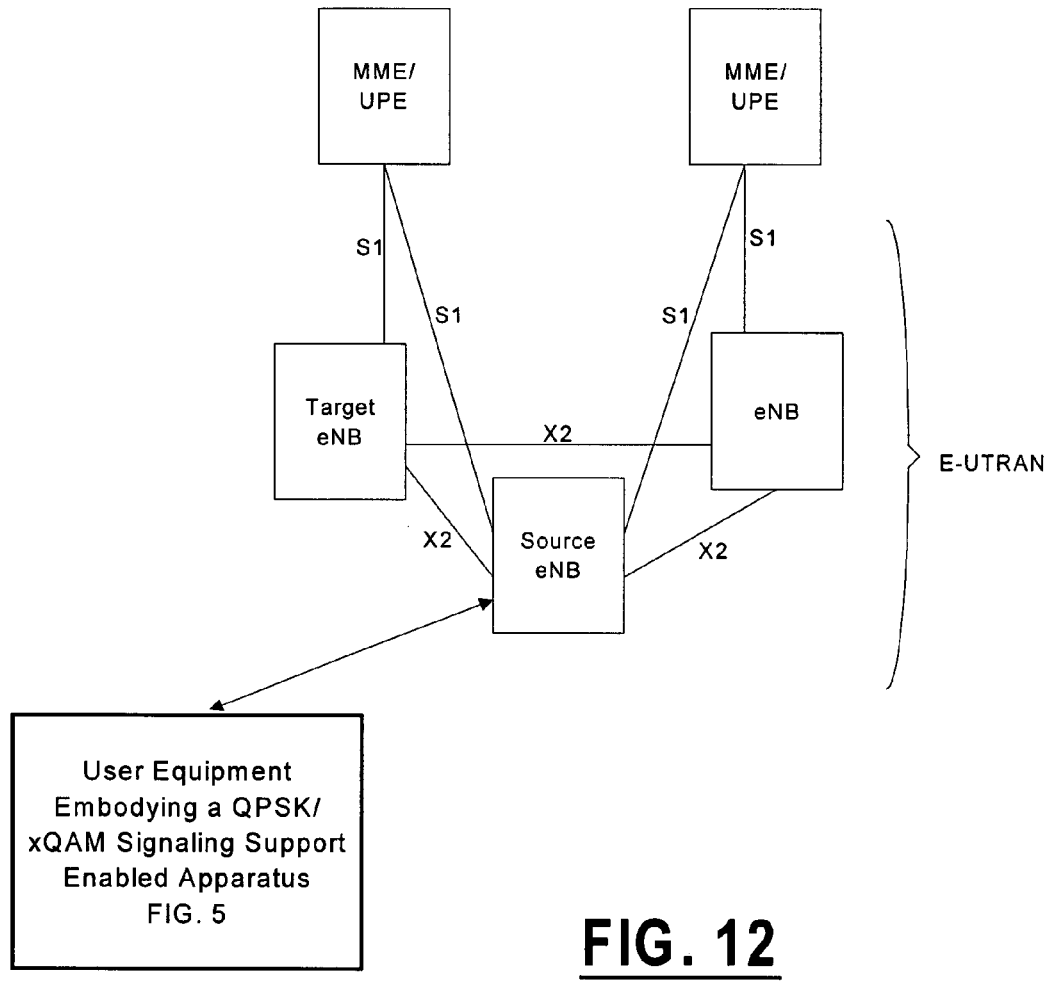
FIG. 12 shows an example of an E-UTRAN architecture with which the concept according to some embodiments of the invention may be used.

An example of the E-UTRAN architecture is illustrated in FIG. 12. This example of E-UTRAN consists of eNBs, providing the E-UTRA user plane (RLC/MAC/PHY) and control plane (RRC) protocol terminations towards the UE. The eNBs are interconnected with each other by means of the X2 interface. The eNBs are also connected by means of the S1 interface to the EPC (evolved packet core) more specifically to the MME (mobility management entity) and the UPE (user plane entity). The S1 interface supports a many-to-many relation between MMEs/UPEs and eNBs. The S1 interface supports a functional split between the MME and the UPE. The MMU/UPE in the example of FIG. 10 is one option for the access gateway (aGW).

In the example of FIG. 12, there exists an X2 interface between the eNBs that need to communicate with each other. For exceptional cases (e.g. inter-PLMN handover), LTE_ACTIVE inter-eNB mobility is supported by means of MME/UPE relocation via the S1 interface.

The eNB may host functions such as radio resource management (radio bearer control, radio admission control, connection mobility control, dynamic allocation of resources to UEs in both uplink and downlink), selection of a mobility management entity (MME) at UE attachment, routing of user plane data towards the user plane entity (UPE), scheduling and transmission of paging messages (originated from the MME), scheduling and transmission of broadcast information (originated from the MME or O&M), and measurement and measurement reporting configuration for mobility and scheduling. The MME/UPE may host functions such as the following: distribution of paging messages to the eNBs, security control, IP header compression and encryption of user data streams; termination of U-plane packets for paging reasons; switching of U-plane for support of UE mobility, idle state mobility control, SAE bearer control, and ciphering and integrity protection of NAS signaling.

The functionality described above (for both the radio access network and the UT) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention.

The invention claimed is:

1. Method, comprising:
 interpreting a modulation indication bit as a quadrature phase shift keying/quadrature amplitude modulation (QPSK/xQAM) indication if both a user equipment (UE) and a serving cell support 64 quadrature amplitude modulation (64QAM) according to the following condition:
 interpreting the 7 channelization code-set information bits in the high speed shared control channel (HS-SCCH) part 1 structure as defined in the 3GPP release 5 specification if quadrature phase shift keying (QPSK) is indicated;
 interpreting the 7 channelization code-set information bits in the high speed shared control channel (HS-SCCH) part 1 structure such that only 6 bits are used for code-set information and one bit is stolen for use for 16QAM/64QAM selection if xQAM is indicated by the modulation indication bit; and
 demodulating a received signal using the interpreted information.

2. The method according to claim 1 further comprising deriving from the modulation a value of a modulation indication bit $X_{ms,1}$ and given by the following condition:

$$x_{\text{ms},1} = \begin{matrix} 0 \text{ if } QPSK \\ 1 \text{ otherwise} \end{matrix}$$

3. The method according to claim 1 further comprising coding the channelization code-set bits $X_{ccs,1}$, $X_{ccs,2}$, - - -, $X_{ccs,7}$ according to the following condition:
 given P codes, or P multicodes, or P codes and multicodes starting at code O, and given the HS-SCCH number, if 64QAM is configured for the user equipment (UE) and $x_{ms,1}=1$, calculating the information-field using the unsigned binary representation of integers calculated by the expressions:
for the first three bits of which $x_{ccs,1}$ is the MSB:
$x_{ccs,1}$, $x_{ccs,2}$, $x_{ccs,3}$=min(P−1,15−P); or
if 64QAM is not configured for the user equipment (UE), or
if 64QAM is configured and $x_{ms,1}=0$, then
for the last four bits of which $x_{ccs,4}$ is the MSB:
$x_{ccs,4}$, $x_{ccs,5}$, $x_{ccs,6}$, $x_{ccs,7}$=O−1−⌊P/8⌋*15|;

otherwise if 64 quadrature amplitude modulation (64QAM) is configured for the user equipment (UE) and $x_{ms,1}=1$, P and O shall fulfill $|O-1-\lfloor P/8 \rfloor*15|$ mod $2=$(HS-SCCH number)mod 2, and then $x_{ccs,4}$, $x_{ccs,5}$, $x_{ccs,6}$, $x_{ccs,dummy}=|O-1-\lfloor P/8 \rfloor*15|$ where $x_{ccs,dummy}$ is a dummy bit that is not transmitted on the HS-SCCH, and $$x_{ccs,7} = \begin{cases} 0 \text{ if } 16QAM \\ 1 \text{ if } 64QAM \end{cases}.$$

4. A method, comprising:
receiving multi-bit control channel information at an apparatus, the multi-bit control channel information comprising a set of n bits, where n is an integer;
if the apparatus is configured for a first type of modulation of a first modulation scheme, examining a modulation indication bit of the multi-bit control channel information to determine if the modulation indication bit indicates a second modulation scheme;
if the modulation indication bit indicates the second modulation scheme, interpreting all n bits of the set of n bits as channelization code-set bits;
if the modulation indication bit does not indicate the second modulation scheme, interpreting n-m bits of the set of n bits as channelization code-set bits, where m is an integer;
determining if a remaining bit or bits of the set of n bits indicates the first type of modulation of the first modulation scheme or another type of modulation of the first modulation scheme; and
demodulating a received signal using information obtained when interpreting and determining.

5. The method as in claim 4, where n=7 and m=1, where the first modulation scheme is quadrature amplitude modulation (QAM), where the first type of modulation of the first modulation scheme is 64QAM, where the another type of modulation of the first modulation scheme is 16QAM, and where the second modulation scheme is quadrature phase shift keying (QPSK).

6. The method as in claim 4, where a value of zero of the modulation indication bit indicates the second modulation scheme.

7. The method as in claim 4, where the multi-bit control channel information is comprised of a high speed shared control channel (HS-SCCH) part 1.

8. The method as in claim 7, where the modulation indication bit is designated $x_{ms,1}$, where $x_{ms,1}=0$ indicates the second modulation scheme is quadrature offset phase shift keying (QPSK), where the channelization code-set bits comprise an information field designated $X_{ccs,1}$, $X_{ccs,2}$, - - -, $X_{ccs,7}$, and where the channelization code-set bits $X_{ccs,1}$, $X_{ccs,2}$, - - -, $X_{ccs,7}$ are coded according to:
given P codes, or P multicodes, or P codes and multicodes starting at code O, and given a HS-SCCH number, if 64QAM is configured for the apparatus and $x_{ms,1}=1$, calculating the information field using the unsigned binary representation of integers calculated as,
for the first three bits of which $x_{ccs,1}$ is the MSB:
$x_{ccs,1}$, $x_{ccs,2}$, $x_{ccs,3}=\min(P-1,15-P)$; or
if 64QAM is not configured for the apparatus, or if 64QAM is configured for the apparatus and $x_{ms,1}=0$, then
for the last four bits of which $x_{ccs,4}$ is the MSB:
$x_{ccs,4}$, $x_{ccs,5}$, $x_{ccs,6}$, $x_{ccs,7}=|O-1-\lfloor P/8 \rfloor*15|$;
otherwise if 64QAM is configured for the apparatus and $x_{ms,1}=1$, then P and O fulfill $|O-1-\lfloor P/8 \rfloor*15|$ mod $2=$(HS-SCCH number)mod 2, and $x_{ccs,4}$, $x_{ccs,5}$, $x_{ccs,6}$, $x_{ccs,dummy}=|O-1-\lfloor P/8 \rfloor*15|$, where $x_{ccs,dummy}$ is a dummy bit that is not transmitted, and $$x_{ccs,7} = \begin{cases} 0 \text{ if } 16QAM \\ 1 \text{ if } 64QAM \end{cases}.$$

9. The method as in claim 8, where the HS-SCCH number is given by a position in a list of HS-SCCH channelization code information signaled by higher layers.

10. The method as in claim 8, where the HS-SCCH number is associated with the code offset indicator and the code group indicator if 64QAM is configured for the apparatus and $x_{ms,1}=1$.

11. The method as in claim 7, further comprising indicating the modulation scheme of a second data stream in multiple-input multiple-output signaling in which the HS-SCCH part 1 indicates the apparatus as either one (single-stream) or two (dual-stream) separate parallel high speed data packet access data transmission on high speed physical downlink shared channels in which a rank indicator bit in the HS-SCCH part 1 indicates whether one or two data streams are being transmitted.

12. The method as in claim 4, where the apparatus comprises a user equipment (UE), and where the method is performed as a result of execution of computer program instructions stored in a memory that comprises part of the UE.

13. A memory that stores instructions that when executed by a controller of an apparatus result in operations that comprise:
receiving multi-bit control channel information, the multi-bit control channel information comprising a set of n bits, where n is an integer;
if the apparatus is configured for a first type of modulation of a first modulation scheme, examining a modulation indication bit of the multi-bit control channel information to determine if the modulation indication bit indicates a second modulation scheme;
if the modulation indication bit indicates the second modulation scheme, interpreting all n bits of the set of n bits as channelization code-set bits;
if the modulation indication bit does not indicate the second modulation scheme, interpreting n-m bits of the set of n bits as channelization code-set bits, where m is an integer;
determining if a remaining bit or bits of the set of n bits indicates the first type of modulation of the first modulation scheme or another type of modulation of the first modulation scheme; and
demodulating a received signal using information obtained when interpreting and determining.

14. The memory as in claim 13, where n=7 and m=1, where the first modulation scheme is quadrature amplitude modulation (QAM), where the first type of modulation of the first modulation scheme is 64QAM, where the another type of modulation of the first modulation scheme is 16QAM, where the second modulation scheme is quadrature phase shift keying (QPSK), where the multi-bit control channel information is comprised of a high speed shared control channel (HS-SCCH) part 1, and where a value of zero of the modulation indication bit indicates the second modulation scheme.

15. The memory as in claim 14, where the modulation indication bit is designated $x_{ms,1}$, where $x_{ms,1}=0$ indicates the second modulation scheme is offset quadrature phase shift keying (QPSK), where the channelization code-set bits comprise an information field designated $X_{ccs,1}$, $X_{ccs,2}$, $X_{ccs,7}$, and where the channelization code-set bits $X_{ccs,1}$, $X_{ccs,2}$, ---, $X_{ccs,7}$ are coded according to:
given P codes, or P multicodes, or P codes and multicodes starting at code O, and given a HS-SCCH number, if 64QAM is configured for the apparatus and $x_{ms,1}$, calculating the information field using the unsigned binary representation of integers calculated as,
for the first three bits of which $x_{ccs,1}$ is the MSB:
$x_{ccs,1}$, $x_{ccs,2}$, $x_{ccs,3}$=min(P−1,15−P); or
if 64QAM is not configured for the apparatus, or if 64QAM is configured for the apparatus and $x_{ms,1}$=0, then
for the last four bits of which $x_{ccs,4}$ is the MSB:
$x_{ccs,4}$, $x_{ccs,5}$, $x_{ccs,6}$, $x_{ccs,7}$=|O−1−⌊P/8⌋*15|;
otherwise if 64QAM is configured for the apparatus and $x_{ms,1}$=1, then P and O fulfill |O−1−⌊P/8⌋*15|mod 2=(HS-SCCH number)mod 2, and $x_{ccs,4}$, $x_{ccs,5}$, $x_{ccs,6}$, $x_{ccs,dummy}$=|O−1−⌊P/8⌋*15|, where $x_{ccs,dummy}$ is a dummy bit that is not transmitted, and $$x_{ccs,7} = \begin{cases} 0 & \text{if } 16QAM \\ 1 & \text{if } 64QAM \end{cases}.$$

16. The memory as in claim 15, where the HS-SCCH number is given by a position in a list of HS-SCCH channelization code information signaled by higher layers.

17. The memory as in claim 15, where the HS-SCCH number is associated with the code offset indicator and the code group indicator if 64QAM is configured for the apparatus and $x_{ms,1}$=1.

18. The memory as in claim 14, further comprising indicating the modulation scheme of a second data stream in multiple-input multiple-output signaling in which the HS-SCCH part 1 indicates the apparatus as either one (single-stream) or two (dual-stream) separate parallel high speed data packet access data transmission on high speed physical downlink shared channels in which a rank indicator bit in the HS-SCCH part 1 indicates whether one or two data streams are being transmitted.

19. An apparatus, comprising:
a controller configured with a receiver to receive multi-bit control channel information that comprises a set of n bits, where n is an integer, said controller being further configured, if the apparatus is configured for a first type of modulation of a first modulation scheme, to examine a modulation indication bit of the multi-bit control channel information to determine if it indicates a second modulation scheme, said controller being further configured, if the modulation indication bit indicates the second modulation scheme, to interpret all n bits of the set of n bits as channelization code-set bits or, if the modulation indication bit does not indicate the second modulation scheme, to interpret n-m bits of the set of n bits as channelization code-set bits, where m is an integer, said controller being further configured to determine if a remaining bit or bits of the set of n bits indicates the first type of modulation of the first modulation scheme or another type of modulation of the first modulation scheme, said apparatus demodulating a received signal using information obtained when interpreting and determining.

20. The apparatus as in claim 19, where n=7 and m=1, where the first modulation scheme is quadrature amplitude modulation (QAM), where the first type of modulation of the first modulation scheme is 64QAM, where the another type of modulation of the first modulation scheme is 16QAM, where the second modulation scheme is quadrature phase shift keying (QPSK), and where the multi-bit control channel information is comprised of a high speed shared control channel (HS-SCCH) part 1.

21. The apparatus as in claim 20, where the apparatus comprises a user equipment (UE), where the modulation indication bit is designated $x_{ms,1}$, where $x_{ms,1}$=0 indicates the second modulation scheme is offset quadrature phase shift keying (QPSK), where the channelization code-set bits comprise an information field designated $X_{ccs,1}$, $X_{ccs,2}$, ---, $X_{ccs,7}$, where the channelization code-set bits $X_{ccs,1}$, $X_{ccs,2}$, ---, $X_{ccs,7}$ are coded according to:
given P codes, or P multicodes, or P codes and multicodes starting at code O, and given a HS-SCCH number, if 64QAM is configured for the UE and $x_{ms,1}$=1, calculating the information field using the unsigned binary representation of integers calculated as, for the first three bits of which $x_{ccs,1}$ is the MSB:
$x_{ccs,1}$, $x_{ccs,2}$, $x_{ccs,3}$=min(P−1,15−P); or
if 64QAM is not configured for the UE, or if 64QAM is configured for the UE and $x_{ms,1}$0, then
for the last four bits of which $x_{ccs,4}$ is the MSB:
$x_{ccs,4}$, $x_{ccs,5}$, $x_{ccs,6}$, $x_{ccs,7}$=|O−1−⌊P/8⌋*15|;
otherwise if 64QAM is configured for the UE and $x_{ms,1}$=1, P and O fulfill |O−1−⌊P/8⌋*15| mod 2=(HS-SCCH number)mod 2, and then $x_{ccs,4}$, $x_{ccs,5}$, $x_{ccs,6}$, $x_{ccs,dummy}$=|O−1−⌊P/8⌋*15|, where $x_{ccs,dummy}$ is a dummy bit that is not transmitted on the HS-SCCH, and $$x_{ccs,7} = \begin{cases} 0 & \text{if } 16QAM \\ 1 & \text{if } 64QAM \end{cases}.$$

22. The apparatus as in claim 21, where the HS-SCCH number is given by a position in a list of HS-SCCH channelization code information signaled by higher layers, or where the HS-SCCH number is associated with the code offset indicator and the code group indicator if 64QAM is configured for the UE and $x_{ms,1}$=1.

23. The apparatus as in claim 20, further comprising indicating the modulation scheme of a second data stream in multiple-input multiple-output signaling in which the HS-SCCH part 1 indicates the apparatus as either one (single-stream) or two (dual-stream) separate parallel high speed data packet access data transmission on high speed physical downlink shared channels in which a rank indicator bit in the HS-SCCH part 1 indicates whether one or two data streams are being transmitted.

* * * * *

UNITED STATES PATENT AND TRADEMARK OFFICE
CERTIFICATE OF CORRECTION

| | | |
|---|---|---|
| PATENT NO. | : 7,715,430 B2 | |
| APPLICATION NO. | : 11/980188 | |
| DATED | : May 11, 2010 | |
| INVENTOR(S) | : Ranta-Aho et al. | |

It is certified that error appears in the above-identified patent and that said Letters Patent is hereby corrected as shown below:

In the Claims:

Claim 2, column 12, line 50, after "otherwise" please insert a --.--.

Claim 3, column 12, line 67, please insert a --|-- after the "=".

Claim 8, column 13, line 50, after "quadrature" please delete "offset".

Claim 15, column 14, line 66, after "is" please delete "offset".

Claim 15, column 15, line 1, after "Xccs, 2," please insert -- ---,--.

Claim 21, column 16, line 17, after "is" please delete "offset".

Claim 21, column 16, line 26, after "as," a new indented line should start beginning with the words "for the first three...".

Claim 21, column 16, line 27, after "bits" please insert --(code group indicator)--.

Claim 21, column 16, line 30, after "xms,1" please insert "=" before "0".

Claim 21, column 16, line 31, after "bits" insert --(code offset indicator)--.

Signed and Sealed this
Fifteenth Day of February, 2011

David J. Kappos
*Director of the United States Patent and Trademark Office*